3,130,929
METHOD OF REELING AND UNREELING ELECTRIC CABLE
Robert T. Shiels, Jr., Darien, Conn., and Robert M. Zangler, Jr., Yonkers, N.Y., assignors to Anaconda Wire and Cable Company, a corporation of Delaware
Filed Jan. 28, 1963, Ser. No. 254,147
2 Claims. (Cl. 242—25)

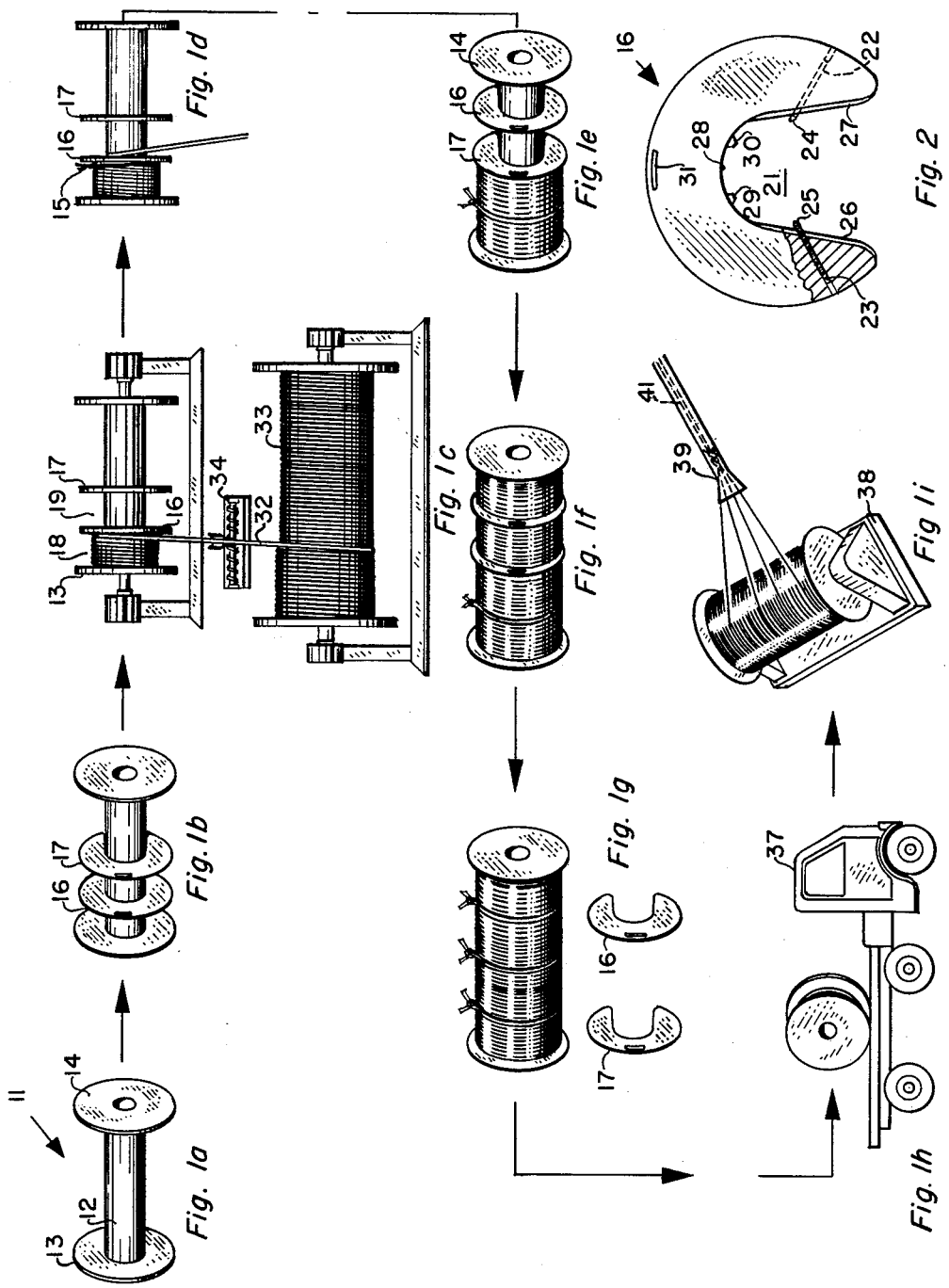

Our invention relates to a method of reeling and unreeling electric cables and particularly to a method of forming parallel lengths of cable from a single continuous supply.

In the installation of electric cables it is usually necessary to have a plurality, such as two, three, or four conductors in parallel in a circuit, according to the phase structure of the electrical system. When the cables are shipped, however, they are shipped on reels of continuous length of single conductor unless some special provision is made for paralleling as will hereinafter be explained. If the run of cable is very long, so that a large plurality of reels is required, it is a simple matter to pull the cables from two or more single wound reels simultaneously at the installation site to form a parallel circuit. Where, however, the length of cable required is insufficient to fill the necessary number of reels a number of methods have been known to form the cables in parallel runs. Usually the cables are required to be pulled into a duct or conduit by means of a tow line that must first be threaded therethrough. If the required number of lines were pulled into the conduit one at a time, it would require a plurality of rethreadings of the tow line, so that it is much preferable to pull all the parallel conductors into the conduit simultaneously. It is necessary, then, to pull one after another of the required lengths from the reel and lay them out in parallel on the ground prior to pulling them in. This presents a danger of damage by vehicles or may, in fact, not be possible, where no area is available to lay the cables in. For this reason it has been the practice of cable manufacturers, upon the payment of a surcharge, to rewind the required lengths of cable in parallel onto a single reel. But all this accomplished was to transfer the essential problem from the installation site to the cable plant or warehouse. To wind the cables, in parallel, on a single reel, the supplier was required first to wind a plurality of reels, each with a single conductor of the required length, and then rewind the conductor in parallel onto another reel, which would be shipped to the installation site. The shipping reels for cables of the type to which our new method has greatest application are nonreturnable reels. These have been found to be most economical since they eliminate the return shipping charge and the record keeping and billing expenses required when shipping reels are returned to the supplier. Since nonreturnable reels are used only once, their cost must be kept at a minimum and this is done by making them of wood with a wooden drum and inexpensive wooden flanges. We have discovered that the cost of shipping and installing multiple cables can be greatly reduced by the method of inserting at least one removable partition onto the drum of a nonreturnable cable reel and thus dividing the reel traverse into a plurality of substantially equal widths, then winding a length of cable from a supply of the cable onto the drum of the reel; preferably in a helical wind of contiguous turns building a plurality of layers within one of the widths defined by the partitions. Following this we wind a like length of cable from the same supply onto the drum within the remaining widths defined by the partitions and then remove the partitions while leaving the lengths of cable wound thereon. The reel is then transferred to the installation site of the cable and the cable lenths unwound simultaneously, in parallel, from the reel.

A thorough understanding of our invention can be gained from the appended drawing.

In the drawing:

FIGURES 1a–1i are a schematic sequence of the steps of the method of our invention.

FIGURE 2 is a side view of a partition used in the practice of our invention.

Referring to FIGURE 1a, a nonreturnable reel 11 having a wooden drum 12 and wooden flanges 13, 14 is to be wound with four coils of cable. FIGURE 1b shows two removable partitions 16, 17 applied over the drum 12 to set off equal traverse widths 18, 19 (FIGURE 1c). In the method of the drawing it is desired to pull four conductors into a conduit as for a 3-phase Y system with ground. Consequently the partition 17 is placed midway on the reel. Where only two parallel conductors are required the partition 16 would be omitted from the reel 11 and where three cables are reeled the partitions would be placed on the reel to divide the traverse into three equal widths. We have found that it is sufficiently accurate for an experienced operator to judge the positioning of the partitions on the drum 12 by eye, but where greater accuracy is required so that no undue slack develops in one of the cables during the unreeling operation, accurate measurements may be marked on the drum for locating the partitions 16, 17. The partitions 16, 17 are advantageously constructed of a single circular steel plate shown in detail in FIGURE 2. The plate is cut away at 21 to receive the drum 12 and has threaded holes 22, 23 into which pointed, threaded pins 24, 25 are turned with a set-screw wrench, so that they can be driven into the drum 12. The cut-away area 21 is defined by knife-edges 26, 27 which spread apart slightly toward the outer perimeter of the partition 16. A curved wall 28 which fits the curve of the drum 12 has sharp projections 29, 30 which penetrate the wooden drum 12. The dimensions of the knife-edges 26, 27 are chosen so that they cut into the drum 12 when the partition is inserted onto a reel and thus hold the partition rigidly on the reel 11. A hole 31 in the partition 16 provides a hand grip for removing the partition from the reel 12 after cable has been wound on both sides of the partition. It will be understood that, although we have found the partitions of FIGURE 2 to be particularly inexpensive and sturdy and to be free from lateral projections that might interfere with winding or removal of the partitions, the method of our invention is not limited to the partition shown, and partitions made up of a plurality of mating parts, which may be hinged, may also be used, provided that they have sufficient stiffness and strength, means for fixing them firmly to the drum 12, and are free from projections that might interfere with the winding of the cable or the removal of the partition from the reel thereafter.

FIGURE 1c illustrates the next step of winding a cable 32 from a large supply, represented by a reel 33, of cable into the space 18, between the flange 13 and the firmly attached partition 16. The back and forth traverse of the cable into the space 18 can be conveniently accomplished by hand but where a large number of reels of equal dimensions are to be shipped, mechanical traverses of known type may conveniently be used. The possible use of mechanical traverses such as a traverse 34 constitues one of the advantages of our method over the known method of winding a plurality of cables, in parallel, onto a reel. In the latter case, hand winding is obligatory to prevent crossovers and entanglement of the conductors which is apt to occur when a plurality of the same are wound onto a reel together.

After the desired length of cable 32 has been coiled into the space 18 the cable is cut and the end tied down as by a length of tape 15 and a new coil is started in the space 19 between the partitions 16 and 17 as indicated in FIGURE 1d. When this space has been filled the partition 16 is removed from the reel after loosening or removing the pins 24, 25 and re-inserted midway between the partition 17 and the flange 14. Thereafter, the remaining spaces on the reel are wound, one at a time, with the cable 32 and the ends cut and tied down and, when the reel has been filled, the partitions 16, 17 are removed (FIGURE 1g). In the method shown, since one of the partitions can be used twice, only two partitions are required for a 4-coil reel. If three partitions are readily available they can all be applied prior to winding the cable. The filled reel, bearing four coils of the cable 32 is transported, as by a truck 37 (FIGURE 1h) to an installation site, mounted rotatably, as on a pay-off stand 38, and pulled off in parallel into a duct 39 by means of a towline 41 attached to a pulling capstan, not shown. Our method also has utility where the cable is installed overhead rather than in a duct.

Although we have illustrated our method as applied to four cables in parallel, it will be understood that it has utility for other pluralities of cable and particularly to two and three conductors. We have invented a new and useful method for which we desire an award of Letters Patent.

We claim:

1. The method of shipping and installing electric cables, comprising the steps of:
    (A) inserting one or more removable rigid partitions onto the drum of a cable reel and thus dividing the traverse of said reel into a plurality of substantially equal widths,
    (B) winding a length of cable from a supply of said cable onto said drum of said reel building a plurality of layers within one of said widths defined by said partitions,
    (C) winding like lengths of cable from said supply onto said drum of said reel building a plurality of layers within the remaining widths defined by said partitions,
    (D) removing said partitions from said reel while leaving said lengths of cable wound thereon,
    (E) transferring said reel to the installation site of said cable, and
    (F) unwinding said cable lengths simultaneously in parallel from said reel.

2. The method of shipping and installing electric cables comprising the steps of:
    (A) inserting one or more removable rigid partitions onto the drum of a cable reel having a drum and end flanges and thus dividing the traverse of said reel into a plurality of substantially equal widths,
    (B) winding a length of cable from a supply of said cable onto said drum of said reel in a helical wind of contiguous turns building a plurality of layers within one of said widths defined by said partitions,
    (C) winding like lengths of cable from said supply onto said drum of said reel in helical winds of contiguous turns building a plurality of layers within the remaining widths defined by said partitions,
    (D) removing said partitions from said reel while leaving said lengths of cable wound thereon,
    (E) transferring said reel to the installation site of said cable, and
    (F) unwinding said cable lengths simultaneously in parallel from said reel.

References Cited in the file of this patent

UNITED STATES PATENTS 2,140,137    Merkle _____ Dec. 13, 1938